US008703290B2

(12) United States Patent
Wu

(10) Patent No.: US 8,703,290 B2

(45) Date of Patent: Apr. 22, 2014

(54) HYDROPHOBIC CARBON BLACK INTERMEDIATE TRANSFER COMPONENTS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1620 days.

(21) Appl. No.: 12/200,074

(22) Filed: Aug. 28, 2008

(65) Prior Publication Data

US 2010/0055463 A1 Mar. 4, 2010

(51) Int. Cl.

*B32B 5/16* (2006.01)

*G03G 15/20* (2006.01)

(52) U.S. Cl.

USPC ......... 428/407; 428/195.1; 428/206; 399/308

(58) Field of Classification Search

USPC ........................ 428/195.1, 407, 206; 399/308

See application file for complete search history.

(56) References Cited

U.S. PATENT DOCUMENTS

| | | | | |
|---|---|---|---|---|
| 5,487,707 | A | 1/1996 | Sharf et al. | |
| 6,318,223 | B1 | 11/2001 | Yu et al. | |
| 6,397,034 | B1 | 5/2002 | Tarnawskyj et al. | |
| 6,440,515 | B1 | 8/2002 | Thornton et al. | |
| 6,602,156 | B2 | 8/2003 | Schlueter, Jr. | |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 2006/0239727 | A1 * | 10/2006 | Goodman et al. | ............ 399/308 |

FOREIGN PATENT DOCUMENTS

JP 59093740 A * 5/1984

OTHER PUBLICATIONS

Human Translation of JP 59-093740.*

Human Translation of JP 59-093740 (published May 30, 1984).*

Jin Wu, U.S. Appl. No. 12/200,111 entitled Hydrophobic Polyetherimide/Polysiloxane Copolymer Intermediate Transfer Components, filed concurrently herewith.

Jin Wu et al., U.S. Appl. No. 12/200,147 entitled Coated Seamed Transfer Member, filed concurrently herewith.

Jin Wu et al., U.S. Appl. No. 12/200,179 entitled Coated Transfer Member, filed concurrently herewith.

Jin Wu, U.S. Appl. No. 12/129,995, entitled Polyimide Intermediate Transfer Components, filed May 30, 2008.

Jin Wu, U.S. Appl. No. 12/181,354, entitled Core Shell Intermediate Transfer Components, filed Jul. 29. 2008.

Jin Wu, U.S. Appl. No. 12/181,409, entitled Treated Carbon Black Intermediate Transfer Components, filed Jul. 29, 2008.

* cited by examiner

*Primary Examiner* — Gerard Higgins

*Assistant Examiner* — Sathavaram I Reddy

(74) *Attorney, Agent, or Firm* — Eugene O. Palazzo

(57) ABSTRACT

An intermediate transfer media, such as a belt, that includes a fluorinated polymer associated with, attached to, and more specifically, chemically attached to a carbon black.

15 Claims, No Drawings

HYDROPHOBIC CARBON BLACK INTERMEDIATE TRANSFER COMPONENTS

CROSS REFERENCE TO RELATED APPLICATIONS

Illustrated in U.S. application Ser. No. 12/200,111 entitled Hydrophobic Polyetherimide/Polysiloxane Copolymer Intermediate Transfer Components, filed concurrently herewith with the listed individual of Jin Wu, is an intermediate transfer member comprised of a substrate comprising a polyetherimide polysiloxane copolymer.

Illustrated in U.S. application Ser. No. 12/200,147 entitled Coated Seamed Transfer Member, filed concurrently herewith with the plurality of listed individuals of Jin Wu et al., is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179 entitled Coated Transfer Member filed concurrently herewith with the plurality of listed individuals of Jin Wu et al., is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 12/129,995, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of from about 175° C. to about 290° C. over a period of time of from about 10 minutes to about 120 minutes.

Illustrated in U.S. application Ser. No. 12/181,354, filed Jul. 29, 2008, entitled Core Shell Intermediate Transfer Components, the disclosure of which is totally incorporated herein by reference, is an intermediate transfer belt comprised of a substrate comprising a conductive core shell component.

Illustrated in U.S. application Ser. No. 12/181,409, filed Jul. 29, 2008, entitled Treated Carbon Black Intermediate Transfer Components, the disclosure of which is totally incorporated herein by reference, is an intermediate transfer members comprised of a substrate comprising a poly(vinylalkoxysilane) surface treated carbon black.

BACKGROUND

Disclosed are intermediate transfer members, and more specifically, intermediate transfer members useful in transferring a developed image in an electrostatographic, for example xerographic, including digital, image on image, and the like, machines or apparatuses and printers. In embodiments, there are selected intermediate transfer members comprised of surface treated hydrophobic carbon black which is subsequently dispersed in a polymer solution, such as a polyamic acid solution as illustrated in copending applications U.S. application Ser. Nos. 12/129,995, 12/181,354, and 12/181,409, the disclosures of which are totally incorporated herein by reference. The carbon black can be treated with, for example, a fluorinated polymer, and more specifically, a poly (1,1,1,3,3,3-hexafluoroisopropyl acrylate), and the like.

A number of advantages are associated with the intermediate transfer member, such as belt (ITB) of the present disclosure, such as excellent primary size and aggregate size for the surface treated carbon black; dimensional stability; acceptable conductivities; a variety of formulation latitudes for the disclosed ITB as compared to an ITB with an untreated carbon black; ITB humidity insensitivity for extended time periods; excellent dispersability in a polymeric solution; low and acceptable surface friction characteristics; and a simplified economic ITB formation.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member which ultimately can lead to less than complete toner transfer, resulting in low resolution images on the image receiving substrate, and image deterioration. When the image is in color, the image can additionally suffer from color shifting and color deterioration.

In embodiments, the resistivity of the intermediate transfer member is within a range to allow for sufficient transfer. It is also desired that the intermediate transfer member have a controlled resistivity, wherein the resistivity is substantially unaffected by changes in humidity, temperature, bias field, and operating time. In addition, a controlled resistivity is of value so that a bias field can be established for electrostatic transfer. Also, it is of value that the intermediate transfer member not be too conductive as air breakdown may occur.

Attempts at controlling the resistivity of intermediate transfer members by, for example, adding conductive fillers, such as ionic additives and/or carbon black to the outer layer, are disclosed in U.S. Pat. No. 6,397,034 which describes the use of a fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide a weldable intermediate transfer member, which has excellent transfer capabilities, possesses excellent humidity insensitivity characteristics leading to high copy quality where developed images with minimal resolution issues can obtained. It is also desired to provide a weldable intermediate transfer belt that may not, but could, have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps.

REFERENCES

Illustrated in U.S. Pat. No. 7,031,647, the disclosure of which is totally incorporated herein by reference, is an imageable seamed belt containing a lignin sulfonic acid doped polyaniline.

Illustrated in U.S. Pat. No. 7,139,519, the disclosure of which is totally incorporated herein by reference, is an intermediate transfer belt, comprising a belt substrate comprising primarily at least one polyimide polymer; and a welded seam.

Illustrated in U.S. Pat. No. 7,130,569, the disclosure of which is totally incorporated herein by reference, is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and very costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

In embodiments, there is disclosed an intermediate transfer member comprised of a substrate comprising a fluorinated polymer treated surface carbon black; a transfer media comprised of carbon black having chemically attached thereto a fluorinated polymer; a transfer media wherein the fluorinated polymer attached to the carbon black surface is a poly(fluoroalkyl acrylate) or a poly(fluoroalkyl methacrylate), where alkyl contains, for example, from 1 to about 28, from 1 to about 18, from 1 to about 12, and from 1 to about 6 carbon atoms; a transfer media wherein the fluorinated polymer is generated by the free radical polymerization of a fluorinated monomer; an intermediate transfer member, such as an intermediate belt comprised of a substrate comprising a fluorinated polymer treated carbon black, that is, for example, where the fluorinated polymer is attached to the surface of the carbon black; a transfer member comprised of a fluorinated polymer selected from the group consisting of a thermosetting polyimide, a thermoplastic polyimide, a polycarbonate, a polyvinylidene fluoride, a poly(butylene terephthalate), a poly(ethylene-co-tetrafluoroethylene) copolymer, and mixtures thereof; an intermediate transfer member wherein the carbon black selected possesses a DBP absorption of from about 10 to about 500 milliliters/gram; an intermediate transfer member wherein the surface treated carbon black possesses a B.E.T. surface area of from about 100 to about 500 $m^2$/gram; an intermediate transfer member wherein the carbon black possesses a DBP absorption of from about 60 to about 300 milliliters/gram; and an intermediate transfer member wherein the fluoroalkyl monomer selected to generate a polymer is represented by

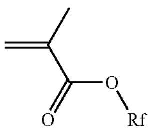

wherein Rf is a fluoroalkyl, and wherein alkyl contains, for example, from about 2 to about 18 carbon atoms; an intermediate transfer member wherein the fluoroalkyl monomer is represented by

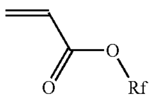

wherein Rf is a fluoroalkyl, and wherein alkyl contains, for example, from about 2 to about 16 carbon atoms.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image and to form a developed image on the charge retentive surface; a weldable intermediate transfer belt to transfer the developed image from the charge retentive surface to a substrate, and a fixing component.

DETAILED DESCRIPTION

Aspects of the present disclosure relate to an intermediate transfer member comprised of a substrate comprising a fluorinated polymer treated surface carbon black; a transfer media comprised of carbon black having chemically attached thereto a fluorinated polymer; and an apparatus for forming images on a recording medium comprising a charge retentive surface to receive an electrostatic latent image thereon; a development component to apply toner to the charge retentive surface to develop the electrostatic latent image, and to form a developed image on the charge retentive surface; and an intermediate transfer belt to transfer the developed image from the charge retentive surface to a substrate, wherein the intermediate transfer belt is comprised of a substrate comprising a fluorinated polymer attached to a carbon black.

In embodiments, the carbon black surface is composed of graphitic planes with oxygen and hydrogen at the edges as represented by

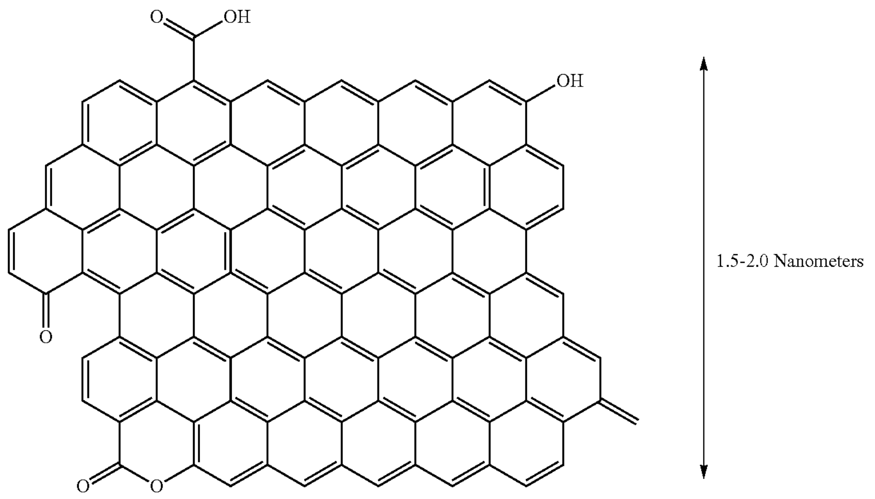

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes, and free radical reactions.

Disclosed herein in embodiments is the chemical attachment of a fluorinated polymer onto carbon, such as carbon black, surfaces via free radical polymerization reactions. Specifically, carbon black is mixed with a fluorinated monomer or mixtures thereof in a suitable solvent. In the presence of a catalyst, a polymerization initiator and heat, the fluorinated monomer is polymerized via free radical polymerization to form the desired fluorinated polymer or its copolymers on the carbon black surface. While the polymerization is in progress, a number of the polymer chains are terminated onto the carbon black surfaces by the absorbed or chemisorbed oxygen groups originating from carboxylates, phenols, and the like on the carbon black surface, that results in the fluorinated polymer being chemically attached onto the carbon black surface.

The conductivity of carbon black is dependent on a number of properties including its surface area and its structure. Generally, the higher surface area, and the higher the structure, the more conductive the carbon black. Surface area can be measured by the B.E.T. (Brunauer Emmett Teller), and the nitrogen absorption surface area per unit weight of carbon black is a measurement of the primary particle size. Structure is a complex property that refers to the morphology of the primary aggregates of carbon black. It is a measure of both the number of primary particles comprising a primary aggregate and the manner in which they are fused together. High structure carbon blacks are characterized by aggregates comprised of many primary particles with considerable branching and chaining, while low structure carbon blacks are characterized by compact aggregates comprised of a few primary particles. Structure can be measured by dibutyl phthalate (DBP) absorption by the voids within carbon blacks. The higher the structure, the more the voids, and the higher is the DBP absorption.

Examples of carbon blacks that may be treated in accordance with embodiments of the present disclosure include VULCAN® carbon blacks, REGAL® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=105 ml/g), BLACK PEARLS® 880 (B.E.T.

surface area=240 $m^2/g$, DBP absorption=106 ml/g), BLACK PEARLS® 800 (B.E.T. surface area=230 $m^2/g$, DBP absorption=68 ml/g), BLACK PEARLS® L (B.E.T. surface area=138 $m^2/g$, DBP absorption=61 ml/g), BLACK PEARLS® 570 (B.E.T. surface area=110 $m^2/g$, DBP absorption=114 ml/g), BLACK PEARLS® 170 (B.E.T. surface area=35 $m^2/g$, DBP absorption=122 ml/g), VULCAN® XC72 (B.E.T. surface area=254 $m^2/g$, DBP absorption=176 ml/g), VULCAN® XC72R (fluffy form of VULCAN® XC72), VULCAN® XC605, VULCAN® XC305, REGAL® 660 (B.E.T. surface area=112 $m^2/g$, DBP absorption=59 ml/g), REGAL® 400 (B.E.T. surface area=96 $m^2/g$, DBP absorption=69 ml/g), and REGAL® 330 (B.E.T. surface area=94 $m^2/g$, DBP absorption=71 ml/g).

Examples of fluorinated monomers selected for the generation of a number of fluorinated polymer containing intermediate transfer members include, for example, a number of available and known fluoroalkyl acrylates and fluoroalkyl methacrylates, represented by the following formulas/structures

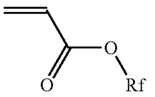

and

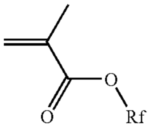

wherein Rf is a fluoroalkyl, and wherein alkyl contains, for example, from about 1 to about 18, from about 2 to about 12, and from about 4 to about 10 carbon atoms.

Specific Rf examples in accordance with embodiments of the present disclosure include 1,1,1,3,3,3-hexafluoroisopropyl, 3,3,4,4,5,5,6,6,7,7,8,8,9,9,10,10,10-heptadecafluorodecyl, 3,3,4,4,5,5,6,6,7,8,8,8-dodecafluoro-7-(trifluoromethyl) octyl, 2,2,2-trifluoroethyl, 2,2,3,3,3-pentafluoropropyl, 2,2,3,3,4,4,4-heptafluorobutyl, 2,2,3,3,4,4,5,5,6,6,7,7-dodecafluoroheptyl, 2,2,3,3,4,4,5,5-octafluoropentyl, 2,2,3,4,4,4-hexafluorobutyl, 3,3,4,4,5,5,6,6,7,7,8,8,8-tridecafluorooctyl, 3,3,4,4,5,5,6,6,7,7,8,8,9,10,10,10-hexadecafluoro-9-(trifluoromethyl)decyl, 3,3,4,4,5,5,6,6,7,7,8,8,9,9,10,10,11,11,12,12,12-heneicosafluorododecyl, 3,3,4,4,5,5,6,6,7,7,8,8,9,9,10,10,11,12,12,12-eicosafluoro-11-(trifluoromethyl)dodecyl, mixtures thereof, and the like.

Specific fluoroalkyl acrylate and fluoroalkyl methacrylate examples selected in accordance with embodiments of the present disclosure include 1,1,1,3,3,3-hexafluoroisopropyl acrylate, 3,3,4,4,5,5,6,6,7,7,8,8,9,9,10,10,10-heptadecafluorodecyl acrylate, 3,3,4,4,5,5,6,6,7,8,8,8-dodecafluoro-7-(trifluoromethyl)octyl acrylate, 2,2,2-trifluoroethyl acrylate, 2,2,3,3,3-pentafluoropropyl acrylate, 2,2,3,3,4,4,4-heptafluorobutyl acrylate, 2,2,3,3,4,4,5,5,6,6,7,7-dodecafluoroheptyl acrylate, 2,2,3,3,4,4,5,5-octafluoropentyl acrylate, 2,2,3,4,4,4-hexafluorobutyl acrylate, 3,3,4,4,5,5,6,6,7,7,8,8,8-tridecafluorooctyl acrylate, 3,3,4,4,5,5,6,6,7,7,8,8,9,10,10,10-hexadecafluoro-9-(trifluoromethyl)decyl acrylate, 3,3,4,4,5,5,6,6,7,7,8,8,9,9,10,10,11,11,12,12,12-heneicosafluorododecyl acrylate, 1,1,1,3,3,3-hexafluoroisopropyl methacrylate, 2,2,2-trifluoroethyl methacrylate, 2,2,3,3,3-pentafluoropropyl methacrylate, 2,2,3,3,4,4,4-heptafluorobutyl methacrylate, 2,2,3,3,4,4,5,5-octafluoropentyl methacrylate, 2,2,3,3-tetrafluoropropyl methacrylate, 2,2,3,4,4,4-hexafluorobutyl methacrylate, 3,3,4,4,5,5,6,6,7,7,8,8,8-tridecafluorooctyl methacrylate, 3,3,4,4,5,5,6,6,7,7,8,8,9,10,10,10-hexadecafluoro-9-(trifluoromethyl) decyl methacrylate, 3,3,4,4,5,5,6,6,7,7,8,8,9,9,10,10,10-heptadecafluorodecyl methacrylate, 3,3,4,4,5,5,6,6,7,7,8,8,9,9,10,10,11,11,12,12,12-heneicosafluoro dodecyl methacrylate, 3,3,4,4,5,5,6,6,7,7,8,8,9,9,10,10,11,12,12,12-eicosafluoro-11-(trifluoromethyl)dodecyl methacrylate, 3,3,4,4,5,5,6,6,7,8,8,8-dodecafluoro-7-(trifluoromethyl)octyl methacrylate, 3,3,4,4,5,6,6,6-octafluoro-5-(trifluoromethyl) hexyl methacrylate (all available from Aldrich), and the like, and in embodiments mixtures thereof.

In embodiments the fluoroalkyl acrylates and fluoroalkyl methacrylate monomers selected for the generation or formation of the fluorinated polymer containing intermediate transfer members, such as belts, and which polymers are attached to a carbon black surface, are represented by the following structures/formulas

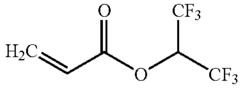

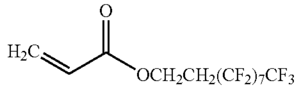

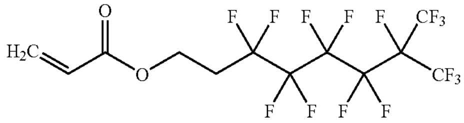

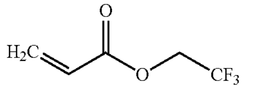

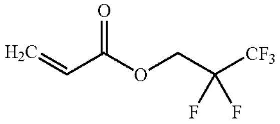

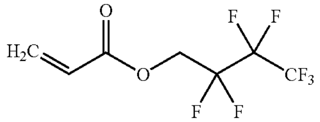

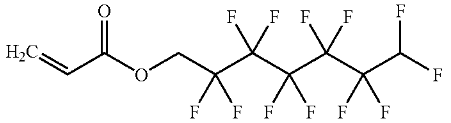

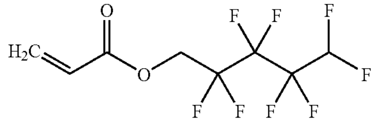

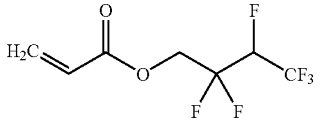

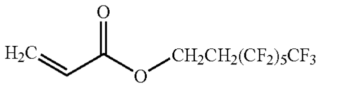

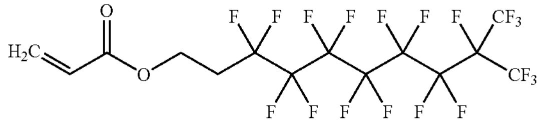

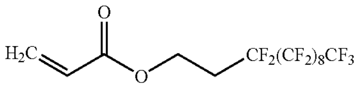

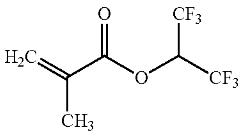

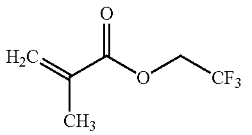

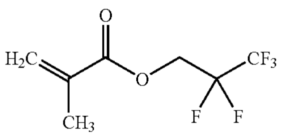

-continued

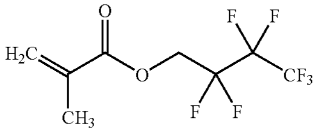

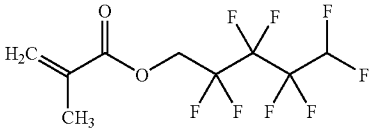

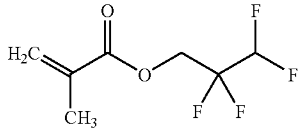

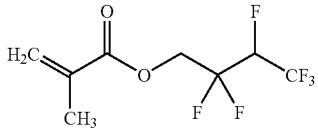

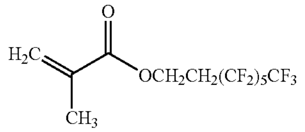

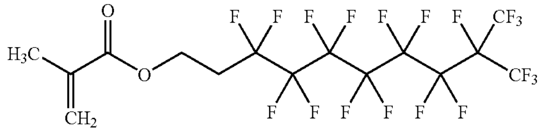

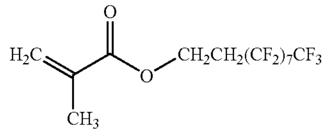

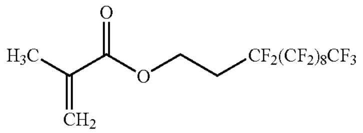

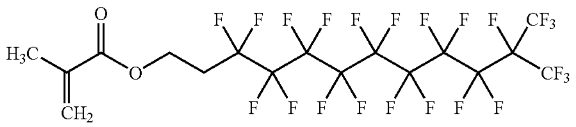

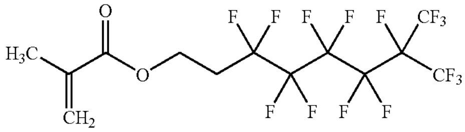

and

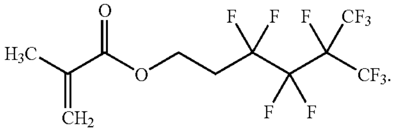

Commercially available fluoroalkyl acrylate and fluoroalkyl methacrylate monomer examples selected for the polymerization thereof to the corresponding polymers are ZONYL® TM (a fluoroalkyl methacrylate with, for example, a weight average molecular weight of 534), and ZONYL® TA-N (a fluoroalkyl acrylate with, for example, a weight average molecular weight of 569), both available from E.I. DuPont.

The weight ratio of carbon black and fluorinated polymer like a fluoroalkyl acrylate or a fluoroalkyl methacrylate is, for example, from about 1/100 to about 100/1, from about 1/60 to about 20/1, from about 1/20 to about 5/1, from about 1/10 to about 1/100, from about 1/5 to about 50/1, from about 1/5 to about 2/1, or from about 1/4 to about 30/1. The molecular weight of the attached poly(fluoroalkyl acrylate), poly(fluoroalkyl methacrylate) or their copolymers is dependant, for example, on both the fluorinated monomer amount and the initiator amount. In general, the higher the fluorinated monomer/initiator ratio, the higher the molecular weight of the fluorinated polymer.

The fluorinated polymer is of a suitable molecular weight, such as for example a weight average molecular weight of from about 3,000 to about 50,000, from about 5,000 to about 25,000, from about 7,000 to about 15,000, from about 600 to about 40,000, and the like, while the number average molecular weight of the attached fluorinated polymer is, for example, from about 500 to about 40,000, from about 1,000 to about 15,000, and from about 2,000 to about 10,000.

Examples of the catalyst or initiator selected for the polymerization, such as a free radical polymerization, are thermal initiators commonly used in free radical polymerization. The polymerization can be accomplished by heating the fluorinated monomer and carbon black mixture at, for example, from about room temperature (25° C.) to higher temperatures such as 200° C., and from about 75° C. to about 125° C. depending on the initiator used to initiate the polymerization. When heated, the initiator molecule decomposes into free radicals, and initiates the polymerization of the fluorinated component monomer like a suitable fluorinated monomer, such as a fluoroalkyl acrylate or a fluoroalkyl methacrylate, and more specifically, 1,1,1,3,3,3-hexafluoroisopropyl acrylate. Specific initiator examples include 2,2'-azobis(2-methylpropionitrile) (AIBN), 1,1'-azobis(cyclohexanecarbonitrile), benzoyl peroxide (BPO), dicumyl peroxide, di-tert-amyl peroxide, cumene hydroperoxide, 2,5-bis(tert-butylperoxy)-2,5-dimethylhexane, tert-butyl peroxybenzoate, tert-butylperoxy 2-ethylhexyl carbonate, 1,1-bis(tert-butylperoxy)-3,3,5-trimethylcyclohexane, and the like. The weight ratio of the catalyst to the monomer that is subsequently subjected to a polymerization is, for example, from about 1/1000 to about 1/1, from about 1/400 to about 1/5, or from about 1/100 to about 1/10.

Examples of initiators are represented by

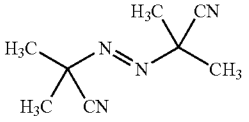

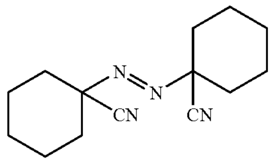

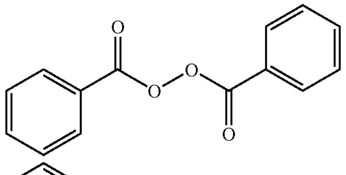

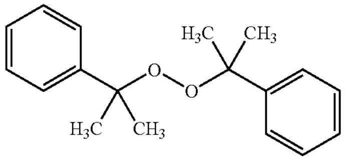

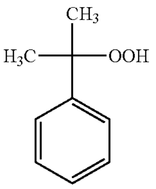

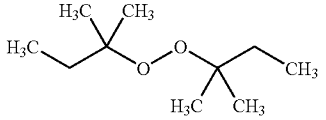

-continued

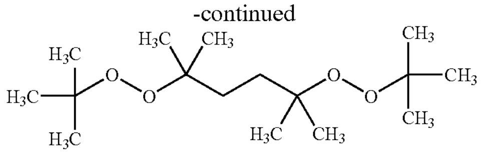

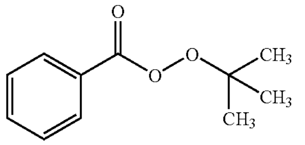

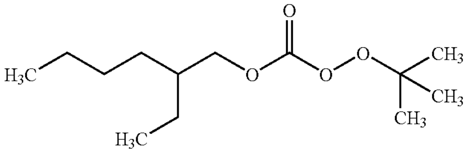

and

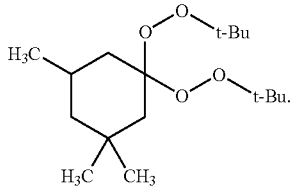

Examples of the solvents used as the polymerization media include a number of suitable known solvents, such as N-methyl-2-pyrrolidone (NMP), N,N-dimethylacetamide (DMAC), N,N-dimethylformamide (DMF), tetrahydrofuran (THF), and the like, where the carbon black to solvent ratio is, for example, from about 1/10 to about 1/500, or from about 1/20 to about 1/100.

Disclosed herein in embodiments is the chemical attachment of a fluorinated polymer, such as poly(1,1,1,3,3,3-hexafluoroisopropyl acrylate) onto carbon, such as carbon black, surfaces by the free radical polymerization reaction illustrated with reference to the following scheme

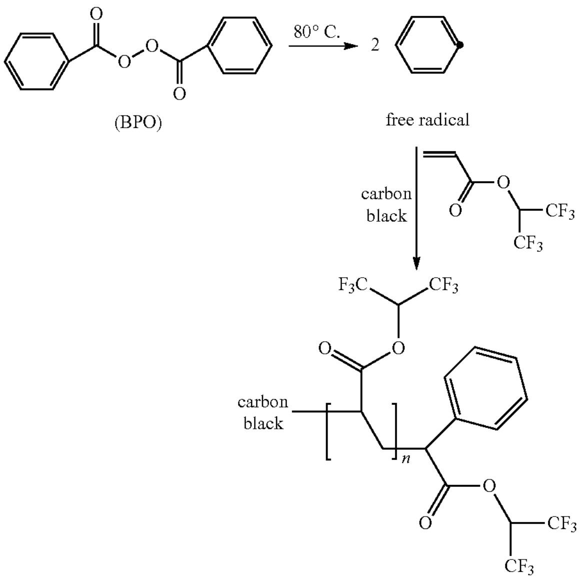

where n represents the number of repeating segments, for example, n is from about 10 to about 1,000, and more specifically, from about 50 to about 500, and for example, where the weight ratio of carbon black/fluorinated monomer/BPO is about 1/1/0.05; the solvent media is NMP; and where the polymerization reaction takes place by heating, such as heating at a temperature of from about 65° C. to about 200° C., from about 75° C. to about 150° C. from about 70° C. to about 100° C., and from about 80° C. to about 90° C., or more specifically, about 80° C. for a suitable period of time, such as for example, from about 3 to about 15 hours, and more specifically, about 8 hours.

The treated or modified carbon black as illustrated is usually formed into a dispersion with a number of materials, such as a polyamic acid solution formed from a polyimide precursor. With suitable known milling processes, uniform dispersions of the fluorinated treated carbon blacks can be obtained, and subsequently, the dispersions can be applied to or coated on a glass plate using known draw bar coating methods. The resulting film or films can be dried at high temperatures, such as from about 100° C. to about 400° C., from about 150° C. to about 300° C., and from about 175° C. to about 200° C. for a sufficient period of time, such as for example, from about 20 to about 180, or from about 75 to about 100 minutes while remaining on the glass plate. After drying and cooling to room temperature, the film or films on the glass plate or separate glass plates are immersed into water overnight, about 18 to 23 hours, and subsequently, the 50 to 150 microns thick film of films formed are released from the glass resulting in the functional intermediate transfer member or members.

Examples of suitable polyamic acid solutions that can be selected for the treated carbon black mixtures include, for example, rapidly cured polyimide polymers such as VTEC™ PI 1388, 080-051, 851, 302, 203, 201 and PETI-5, all available from Richard Blaine International, Incorporated, Reading, Pa. These polymers, which can be considered thermosetting polyimides, are cured at suitable temperatures, and more specifically, from about 180° C. to about 260° C. over a short period of time, such as, for example, from about 10 to about 120, and from about 20 to about 60 minutes; possess, for example, a number average molecular weight of from about 5,000 to about 500,000, or from about 10,000 to about 100,000, and a weight average molecular weight of from about 50,000 to about 5,000,000, or from about 100,000 to about 1,000,000. There can also be selected for the carbon black mixtures thermosetting polyimide precursors that are cured at higher temperatures (above 300° C.) than the VTEC™ PI polyimide precursors, and which precursors include, for example, PYRE-M.L® RC-5019. RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; Durimide® 100 commercially available from FUJIFILM Electronic Materials U.S.A., Inc., North Kingstown, R.I.; and KAPTON® HN, VN and FN, commercially available from E.I. DuPont, Wilmington, Del.

The conductive and hydrophobically treated fluorinated polymer carbon black component of the present disclosure can also be incorporated into or added to thermoplastic materials such as a polyimide, a polycarbonate, a polyvinylidene fluoride (PVDF), a poly(butylene terephthalate) (PBT), a poly(ethylene-co-tetrafluoroethylene) copolymer, and mixtures thereof.

Examples of specific selected thermoplastic polyimides are KAPTON® KJ, commercially available from E.I. DuPont, Wilmington, Del., as represented by

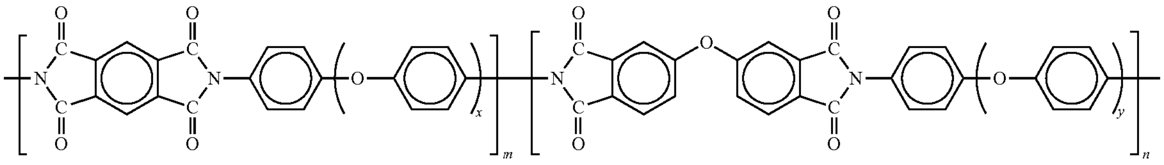

wherein x is equal to 2; y is equal to 2; m and n are from about 10 to about 300; and IMIDEX®, commercially available from West Lake Plastic Company, as represented by

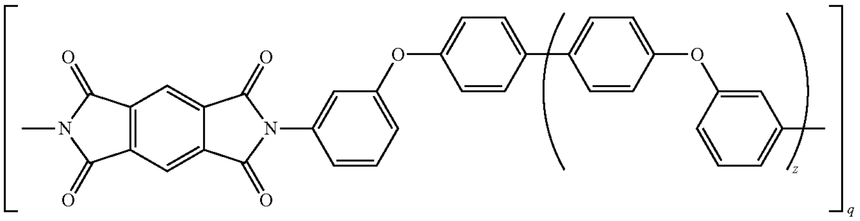

wherein z is equal to 1, and q is from about 10 to about 300.

Examples of additional components present in the intermediate transfer member are a number of known conductive components and polymers, such as polyanilines. In embodiments, the polyaniline component has a relatively small particle size of, for example, from about 0.5 to about 5, from about 1.1 to about 2.3, from about 1.2 to about 2, from about 1.5 to about 1.9, or about 1.7 microns.

Specific examples of polyanilines selected for the transfer member, such as an ITB, are PANIPOL™ F, commercially available from Panipol Oy, Finland; and lignosulfonic acid grafted polyaniline, represented by

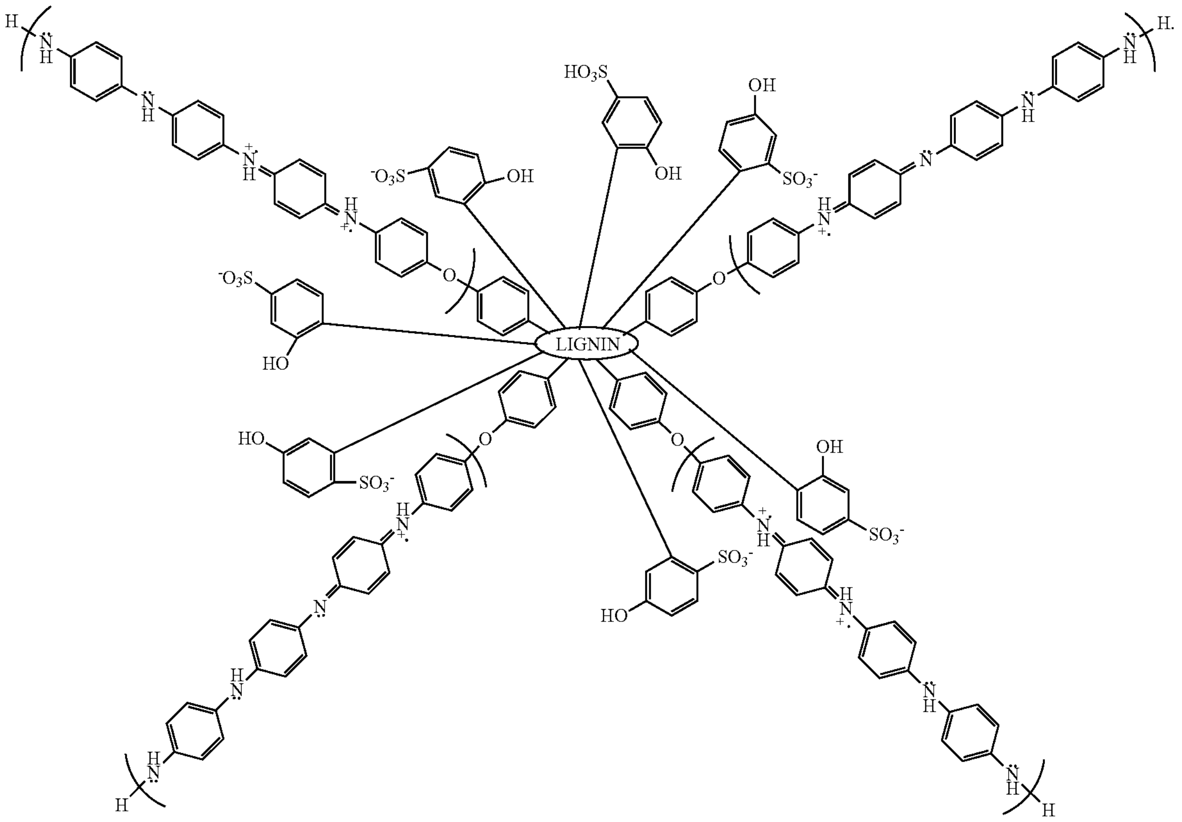

The disclosed intermediate transfer members are in, embodiments, weldable, that is the seam of the member, like a belt, is weldable, and more specifically, may be ultrasonically welded to produce a seam. The surface resistivity of the disclosed intermediate transfer member is, for example, from about $10^9$ to about $10^{13}$, or from about $10^{10}$ to about $10^{12}$ ohm/sq. The sheet resistivity of the intermediate transfer weldable member is, for example, from about $10^9$ to about $10^{13}$, or from about $10^{10}$ to about $10^{12}$ ohm/sq.

The intermediate transfer members, illustrated herein, like intermediate transfer belts, can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer or it can be comprised of several layers, such as from about 2 to about 5 layers. The circumference of the intermediate transfer member, especially as it is applicable to a film or a belt configuration, is, for example, from about 250 to about 2,500, from about 1,500 to about 2,500, or from about 2,000 to about 2,200 millimeters with a corresponding width of, for example, from about 100 to about 1,000, from about 200 to about 500, or from about 300 to about 400 millimeters.

Specific embodiments will now be described in detail. These examples are intended to be illustrative, and the disclosure is not limited to the materials, conditions, or process parameters set forth in these embodiments. All parts are percentages by weight of total solids unless otherwise indicated.

EXAMPLE I

Surface Treatment of Carbon Black with Poly(1,1,1,3,3,3-hexafluoroisopropyl acrylate):

Five (5) grams of VULCAN® XC72R carbon black, obtained from Cabot Corporation, with a B.E.T. surface area of about 254 $m^2$/gram and a DBP absorption of 176 milliliters/gram, 5 grams of 1,1,1,3,3,3-hexafluoroisopropyl acrylate obtained from Aldrich Chemicals, and 0.25 gram of the initiator, benzoyl peroxide (BPO) were mixed in 250 milliliters of NMP. The free radical polymerization of the 1,1,1,3,3,3-hexafluoroisopropyl acrylate and termination of the polymerization on the carbon black surface was accomplished by heating at 80° C. for 8 hours. The resulting mixture was then filtered, and the solid obtained was washed with 500 milliliters of tetrahydrofuran (THF) twice. The resulting treated surface carbon black with poly(1,1,1,3,3,3-hexafluoroisopropyl acrylate) chemically attached to the carbon black surface was dried at 50° C. under a vacuum overnight, about 23 hours. The resulting surface treated carbon black was then used to prepare a number of intermediate transfer belts.

The XPS measurement of the treated carbon black indicated 97.26 atom percent of carbon, 1.66 atom percent of oxygen, 0.12 atom percent of silicon, 0.21 atom percent of sulfur, and 0.74 atom percent of fluorine. In contrast, the XPS measurement of a similar nontreated carbon black indicated 99.48 atom percent of carbon, 0.37 atom percent of oxygen, 0.15 atom percent of sulfur, and zero atom percent of fluorine.

COMPARATIVE EXAMPLE 1

Preparation of ITB with a Nontreated Carbon Black:

VULCAN® XC72R carbon black (CB), obtained from Cabot Corporation, with a BET of about 254 $m^2$/gram and a DBP absorption of 176 milliliters/gram was mixed with the polyamic acid solution, VTEC™ PI 1388 (PI, 20 weight percent solids in NMP obtained from Richard Blaine International, Incorporated), at varying weight ratios (CB/PI=5.5/94.5 in Comparative Example 1 (A); CB/PI=6/94 in Comparative Example 1 (B); and CB/PI=6.5/93.5 in Comparative Example 1 (C)). By ball milling with 2 millimeter stainless shot at 160 rpm overnight, about 23 hours, uniform dispersions were obtained, and then coated on glass plates using a draw bar coating method. Each respective film was dried at 100° C. for 20 minutes, and then at 204° C. for an additional 20 minutes while remaining on the glass plate. After drying and cooling to room temperature, about 23 to 25° C., the separate films on each of the glass plates were immersed into water overnight, about 23 hours, and the resulting individual 50 micron thick freestanding films were released from the individual glass plates automatically.

EXAMPLE II

Preparation of ITB With Poly(1,1,1,3,3,3-hexafluoroisopropyl acrylate) Treated Carbon Black:

The above poly(1,1,1,3,3,3-hexafluoroisopropyl acrylate) treated VULCAN® XC72R carbon black (PHFIPA-CB) of Example I was mixed with the polyamic acid solution, VTEC™ PI 1388 (PI, 20 weight percent solids in NMP obtained from Richard Blaine International, Incorporated) in the weight ratio of 6/94. By ball milling with 2 millimeter stainless shot at 160 rpm overnight, about 23 hours, separate uniform dispersions were obtained, and followed by the coating thereof on individual glass plates using a draw bar coating method. The obtained individual films were dried at 100° C. for 20 minutes, and then 204° C. for an additional 20 minutes while remaining on the glass plates. After drying and cooling to room temperature, the separate films on each of the individual glass plates were immersed into water overnight, about 23 hours, and the resulting 50 micron thick freestanding films were released from each of the individual glass plates automatically.

Surface Resistivity Measurement

The ITB devices of Comparative Examples 1 (A), 1 (B) and 1 (C), and Example II were measured for surface resistivity (under 1,000V, averaging four measurements at varying spots, 72° F./22 percent room humidity) using a High Resistivity Meter (Hiresta-Up MCP-HT450 from Mitsubishi Chemical Corp.), and the results are provided in Table 1.

TABLE 1

| | Surface Resistivity (Ω/sq) |
|---|---|
| Comparative Example 1 (A) | $>10^{14}$ |
| Comparative Example 1 (B) | $>10^{14}$ |
| Comparative Example 1 (C) | $<10^{8}$ |
| Example II | $3.45 \times 10^{11}$ |

Generally, a surface resistivity of from $10^8$ to $10^{13}$ ohm/sq is a suitable ITB range for a number of situations. For the Comparative CB/polyimide ITB devices, the resulting ITB was not as functional as the ITB containing the fluorinated carbon black. Also, for the comparative device, a small change in the CB loading percentage had an adverse effect on surface resistivity either being too conductive or not being conductive enough because the required CB loadings were positioned on the vertical part of the percolation curve, which presented a problem for achieving manufacturing robustness. As comparison, the ITB device of Example II had a surface resistivity within a more suitable range with the disclosed hydrophobic fluorinated CB/PI. The fluorinated surface treatment of the carbon black improved the dispersibility of the carbon black particles, thus allowing an excellent dispersion.

Contact Angle Measurement

The advancing contact angles of water (in deionized water) on the ITB devices of Comparative Example 1 (B) and Example II were measured at ambient temperature (about 23° C.), using the Contact Angle System OCA (Dataphysics Instruments GmbH, model OCA15. At least ten measurements were performed, and their averages are reported in Table 2.

TABLE 2

| | Contact Angle |
|---|---|
| Comparative Example 1 (B) | 71 Degrees |
| Example II | 102 Degrees |

The disclosed ITB device (Example II) with the fluorinated polymer treated carbon black was significantly more hydrophobic (about 3 degrees higher contact angle) than the Comparative Example 1 (B) ITB device with the untreated carbon black.

Theoretically, the above Example II hydrophobic ITB devices would have less humidity sensitivity, thus more dimensional stability than the comparative devices since water is repelled by the Example II devices. It is known that moisture tends to deposit on ITB devices, especially polyimide based ITB devices during idle, and causes disadvantageous wrinkles and undesirable print defects that adversely affect the resolution of the xerographic images transferred from the ITB.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a substrate consisting of a mixture of a carbon black surface treated with a fluorinated polymer of poly(1,1,1,3,3,3-hexafluoroisopropyl acrylate) and a thermoplastic of polyimide, and wherein said fluorinated polymer is chemically attached to said carbon black.

2. The intermediate transfer member in accordance with claim 1 wherein said fluorinated polymer possesses a weight average molecular weight of from about 3,000 to about 50,000.

3. The intermediate transfer member in accordance with claim 1 wherein said fluorinated polymer possesses a number average molecular weight of from about 600 to about 40,000.

4. The intermediate transfer member in accordance with claim 1 wherein the weight ratio of said carbon black to said fluorinated polymer is from about 1/5 to about 50/1.

5. The intermediate transfer member in accordance with claim 1 wherein the weight ratio of said carbon black to said fluorinated polymer is from about 1/10 to about 100/1.

6. An intermediate transfer member in accordance with claim 1 wherein the weight ratio of said carbon black to said fluorinated polymer is from about 1/4 to about 30/1.

7. The intermediate transfer member in accordance with claim 1 wherein said intermediate transfer member is a weldable belt.

8. The intermediate transfer member in accordance with claim 1 wherein said intermediate transfer member has a surface resistivity of from about $10^9$ to about $10^{13}$ ohm/sq.

9. The intermediate transfer member in accordance with claim 1 wherein said surface resistivity is from about $10^{10}$ to about $10^{12}$ohm/sq.

10. The intermediate transfer member in accordance with claim 1 wherein said intermediate transfer member has a circumference of from about 250 to about 2,500 millimeters.

11. An intermediate transfer member consisting of a substrate consisting of a mixture of a carbon black surface treated with a fluorinated polymer of poly(1,1,1,3,3,3-hexafluoroisopropyl acrylate) and a thermoplastic of polyimide, wherein said fluorinated polymer is chemically attached to said carbon black, and wherein the weight ratio of said carbon black to said fluorinated polymer is from about 1/4 to about 30/1.

12. The intermediate transfer member in accordance with claim 11 wherein polymerization of poly(1,1,1,3,3,3-hexaisopropyl acrylate) is accomplished by heating at a temperature of from about 60 degrees Centigrade to about 140 degrees Centigrade.

13. An apparatus for forming images on a recording medium wherein the apparatus comprises a charge retentive surface to receive an electrostatic latent image thereon; a development component to apply toner to said charge retentive surface to develop said electrostatic latent image, and to form a developed image on said charge retentive surface; and an intermediate transfer member to transfer the developed image from said charge retentive surface to a substrate, wherein said intermediate transfer member consists of a substrate consisting of a mixture of a carbon black surface treated with a fluorinated polymer of poly(1,1,1,3,3,3-hexafluoroisopropyl acrylate) and a thermoplastic of polyimide, and wherein said fluorinated polymer is chemically attached to said carbon black.

14. The apparatus in accordance with claim 13 wherein the charge retentive surface is a photoconductor.

15. The intermediate transfer member in accordance with claim 1 wherein said carbon black possess a B.E.T. surface area of from about 20 to about 1,000 $m^2/g$, and wherein said carbon black possesses a DBP absorption of from about 10 to about 500 milliliters/gram.

* * * * *